United States Patent
Maekawa et al.

[11] Patent Number: 6,109,523
[45] Date of Patent: Aug. 29, 2000

[54] ELECTRONIC MONEY COFFER

[75] Inventors: Hitoshi Maekawa; Kazuyuki Yazumi, both of Owariasahi; Manabu Hayashi, Nagoya, all of Japan

[73] Assignee: Hitachi, Ltd., Tokyo, Japan

[21] Appl. No.: 09/037,130

[22] Filed: Mar. 9, 1998

[30] Foreign Application Priority Data

Mar. 11, 1997 [JP] Japan ................................. 9-055930

[51] Int. Cl.$^7$ .................................................. G06K 5/00
[52] U.S. Cl. .......................... 235/380; 235/381; 380/23
[58] Field of Search ............................... 380/23, 29, 52; 109/29, 36, 37; 235/380, 381, 382, 382.5, 486, 487

[56] References Cited

U.S. PATENT DOCUMENTS

| | | | |
|---|---|---|---|
| 4,117,314 | 9/1978 | Schisselbauer et al. | 235/475 |
| 4,145,606 | 3/1979 | Auchinleck et al. | 235/477 |
| 4,593,736 | 6/1986 | Morita | 150/147 |
| 4,647,714 | 3/1987 | Goto | 174/36 |
| 5,315,656 | 5/1994 | Devaux et al. | 380/23 |
| 5,501,361 | 3/1996 | DeMordaunt | 220/529 |

*Primary Examiner*—Thien M. Le
*Attorney, Agent, or Firm*—Antonelli, Terry, Stout & Kraus, LLP

[57] ABSTRACT

An electronic money coffer with an improved safety relative to an abnormal state such as fire. The electronic money coffer is provided with a depository unit having a structure resistant to an abnormal state. The depository unit accommodates the optional number of electronic money storing media such as IC cards excepting those electronic money storing media used in ordinary electronic money dealing. When a sensor detects an abnormal state such as abnormal temperature and smoke caused by a fire or the like, the values of electronic money in the electronic money storing media used in ordinary electronic money dealing are transferred to the electronic money storing media in the depository unit. The electronic money coffer can maintain by itself the safety of electronic money when a fire or the like occurs. The assets in an electronic money dealing system can be safely and reliably managed by the electronic money coffer which is compact and cost effective.

12 Claims, 5 Drawing Sheets

ELECTRONIC MONEY COFFER

BACKGROUND OF THE INVENTION

1. Field of the Invention

The present invention relates to an electronic money coffer for accommodating a number of IC cards and performing electronic money dealing through communications with external apparatuses, and more particularly to an electronic money coffer suitable for improving the safety in an abnormal state such as fire, flood damage, and earthquake.

2. Description of the Related Art

Conventional techniques regarding electronic money dealing are described, for example, in JP-A-62-293469.

In this system disclosed, data is read from or written in an IC card having a CPU, by a personal computer (hereinafter abbreviated as PC) or a dedicated terminal control unit at a bank counter or the like. This system uses a unit for reading/writing data to and from an IC card (hereinafter called an "ICRW unit"). This ICRW unit is connected to, for example, an I/O port of a PC, the IC card stores enciphered electronic money having the value equivalent to cash, and the values are exchanged between IC cards to settle each money dealing.

In the above-described conventional electronic money system, an electronic money coffer corresponding to a cash safe may be thought of, which temporarily stores the value of electronic money in order to carry out electronic money dealing. For example, the electronic money coffer accommodates a number of IC cards, and electronic money dealing is carried out by transferring the values of electronic money between the IC cards accommodated in the electronic money coffer and external IC cards, via communications with the external apparatuses.

Since such an electronic money coffer accommodates a number of IC cards, it stores a large value of electronic money. Therefore, it is desired to protect the electronic money coffer from an abnormal state such as disasters, flood damages, and earthquakes.

SUMMARY OF THE INVENTION

It is an object of the present invention to provide an electronic money coffer capable or maintaining the safety of electronic money assets and protecting it from such an abnormal state.

In order to achieve the above object, the electronic money coffer of this invention is divided into two blocks each accommodating electronic money storing media such as IC cards, and one block is made to have a structure resistant to the abnormal state, e.g., is made fire-resistant by covering it with heat insulating material such as refractory bricks. Sensors such as a thermosensor for detecting an abnormal temperature and a smoke sensor for detecting smoke are mounted on the housing of the electronic money coffer or in a room in which the electronic money coffer is installed. In response to a detection signal of an abnormal state (such as fire, flood damage, and earthquake) from a sensor, the values of electronic money in the IC cards not housed in the block resistant to an abnormal state are transferred to IC cards (electronic money storing media) housed in the block resistant to the abnormal state. In the above manner, the safety of the electronic money coffer can be improved with low cost.

DETAILED DESCRIPTION OF THE PREFERRED EMBODIMENTS

An electronic money coffer (hereinafter also called an electronic money storing apparatus) according to an embodiment of the invention, as well as an electronic money transfer control method, will be described in detail with reference to the accompanying drawings.

Figure 1:
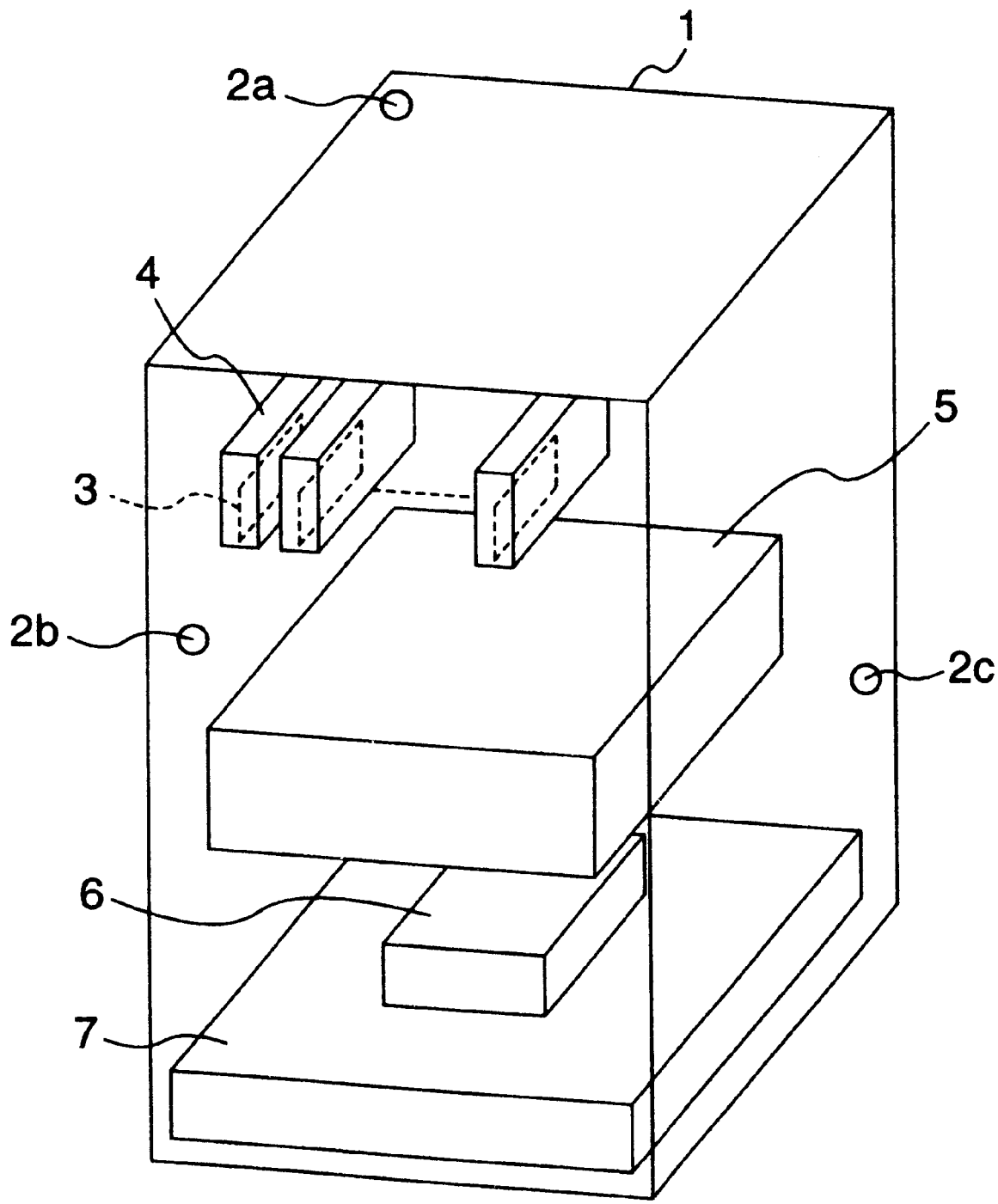
FIG. 1 is a perspective view showing an electronic money coffer according to an embodiment of the invention.

FIG. 1 is a perspective view showing an electronic money coffer according to an embodiment of the invention.

Referring to FIG. 1, reference numeral 1 represents an electronic money coffer, and reference numerals 2a to 2c represent sensors (trouble detecting unit) for detecting an abnormal temperature rise, a smoke emission, a vibration caused by earthquake, and the like. Reference numeral 3 represents an IC card as an electronic money storing medium for storing the value of electronic money. Reference numeral 4 represents an ICRW (IC READ WRITE) unit for reading/writing data to/from the IC card 3. Reference numeral 5 represents a controller for controlling the entirety of the electronic money coffer 1. Reference numeral 6 represents a fire-resistant depository unit, and reference numeral 7 represents an uninterruptible power source with a built-in battery.

As shown in FIG. 1, the electronic money coffer 1 accommodates a number of IC cards 3. These IC cards of a contact or non-contact type carry out electronic money dealing by transferring a value of electronic money to and from personal computers, POS terminals, electronic money terminals at bank counters, or the like. In this embodiment, the electronic money coffer 1 itself has a measure to counter fire and the like. More particularly, in this embodiment, although not shown, one or more electronic money storing media such as IC cards are housed in the depository unit 6. When the sensors 2a to 2c detect an abnormal temperature, a smoke emission or the like, the controller 5 operates to transfer the values of the IC cards accommodated in the ICRW units 4 to the electronic money storing media in the depository unit 6.

In the above manner, electronic money stored in the electronic money coffer 1 can be protected from fire. This electronic money transfer is carried out within the electronic money coffer 1 and relative to the predetermined transfer destination. Therefore, connection processes can be performed reliably and at high speed, ensuring an electronic money transfer operation in a short time and with high reliability.

Furthermore, the electronic money coffer 1 is equipped with the uninterruptible power source 7 having a battery. If a normal power supply to the electronic money coffer 1 is intercepted, the controller 5 detects it and makes the uninterruptible power supply 7 start operating. Therefore, even if the normal power supply is intercepted by fire or the like, a power is supplied from the uninterruptible power source 7 so that the detection operations by the sensors 2a to 2c and the function of transferring electronic money to the depository unit 6, i.e., the electronic money transfer method, can be preserved.

Still further, since only the depository unit 6 is made fire-resistant, the cost required for taking a measure to protect electronic money from fire and the like can be lowered.

Figure 2:
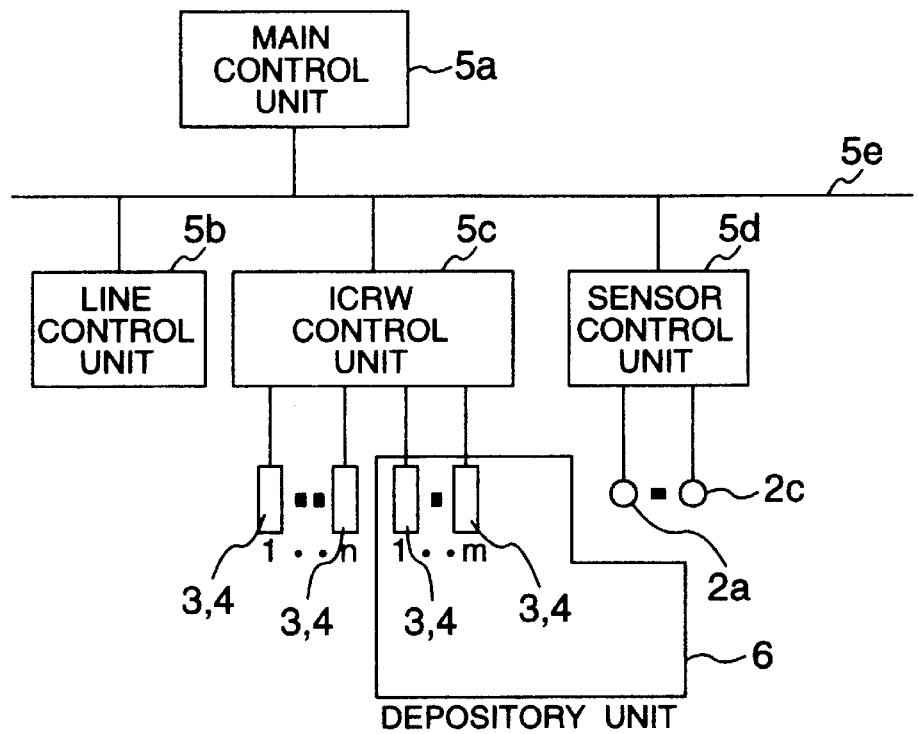
FIG. 2 is a block diagram showing an example of the structure of a controller 5 of the electronic money coffer 1 shown in FIG. 1.

FIG. 2 is a block diagram showing an example of the structure of, mainly the controller 5 of the electronic money coffer 1 shown in FIG. 1.

Referring to FIG. 2, reference numeral 5a represents a main control unit having a CPU (Central Processing Unit) for controlling the entirety of the controller, reference numeral 5b represents a line control unit for the connection control to external terminals such as bank electronic money terminals, reference numeral 5c represents an ICRW control unit for controlling the ICRW units 4 shown in FIG. 1, reference numeral 5d represents a sensor control unit for controlling the sensors 2a to 2c, and reference numeral 5e represents a bus which interconnects respective units.

The operation of the controller 5 constructed as above for the control of the electronic money coffer 1 will be described. It is assumed that the electronic money coffer 1 has n (n=1 to n) IC cards 3 for storing the values of electronic money and n ICRW units 4, that the fire-resistance depository unit 6 has m (m=1 to m) IC cards 3 as the electronic money storing media and m ICRW units 4, and that these cards and units are connected to the ICRW control unit 5c.

Generally, the electronic money coffer 1 carries out a transfer of electronic money to and from external apparatuses supporting electronic money services, such as auto teller machines (ATM), bank terminals and POSs, via the line control unit 5b under the control of the main control unit 5a. In this case, the electronic money transfer to and from these external apparatuses is processed by using the n IC cards 3 not housed in the depository unit 6. The general operation of the m IC cards in the fire-resistant depository unit 6 is not limited specifically. The numbers of the n IC cards not housed in the depository unit 6 and the numbers of the m IC cards in the depository unit 6 are not limited also.

During such electronic money dealing, if a building in which the electronic money coffer 1 is installed suffers from a fire or if the electronic money coffer 1 is destructed with a firearm such as a burner by a criminal, the sensors 2a to 2c detect an abnormal state such as temperature and smoke, which is notified via the sensor control unit 5d to the main control unit 5a. Obviously, the sensor for detecting an abnormal state may be a sensor for detecting an illegal state of forcibly opening the door of the electronic money coffer 1 or a sensor for detecting an abnormal vibration such as earthquake.

Upon occurrence of an abnormal state of the electronic money coffer 1 detected in the above manner, each time electronic money dealing under progress at each of n IC cards 3 not housed in the depository unit 6 is completed, the main control unit 5a instructs the line control unit 5b to sequentially stop a transfer of electronic money from and to an external apparatus. Starting from the IC card 3 whose dealing stopped, the values of electronic money are immediately transferred to the m IC cards 3 in the fire-resistant depository unit 6. In this case, as the timing when a transfer of electronic money to an external apparatus is stopped after the abnormal state such as a fire is detected, the electronic money transfer may be intercepted without waiting for the completion thereof unless there is no practical problem excepting non-establishment of electronic money transfer.

Figure 3:
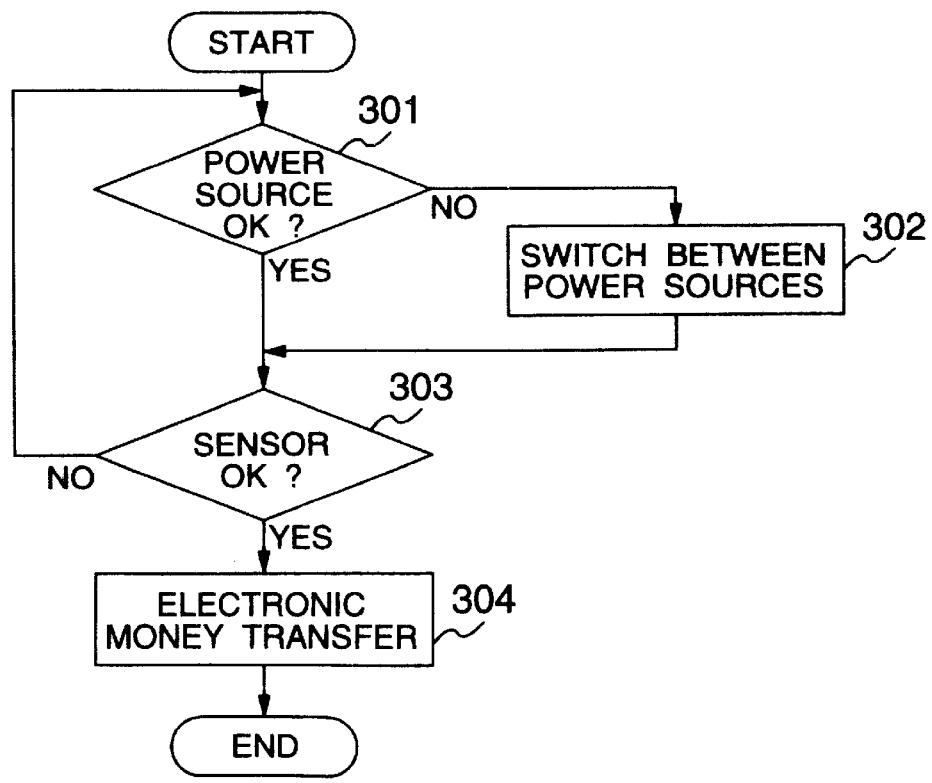
FIG. 3 is a flow chart illustrating an example of processes to be executed by the electronic money coffer.

FIG. 3 is a flow chart illustrating an example of the operation of the electronic money coffer 1 of the embodiment shown in FIG. 1.

If an ordinary power supply is stopped (Step 301), a power source is switched to the uninterruptible power source 7 shown in FIG. 1 (Step 302). Switching between the power sources may be notified to a maintenance center. Next, if any one of the sensors 2a to 2c turns on upon detection of a temperature rise or smoke to be caused by a fire or the like (Step 303), the value of electronic money of each IC card 3 not housed in the depository unit 6 shown in FIG. 1 is transferred to the electronic money storing medium (such as IC card) in the depository unit 6 (Step 304).

A specific example of controlling to transfer electronic money in a short time will be described with reference to FIG. 4.

Figure 4:
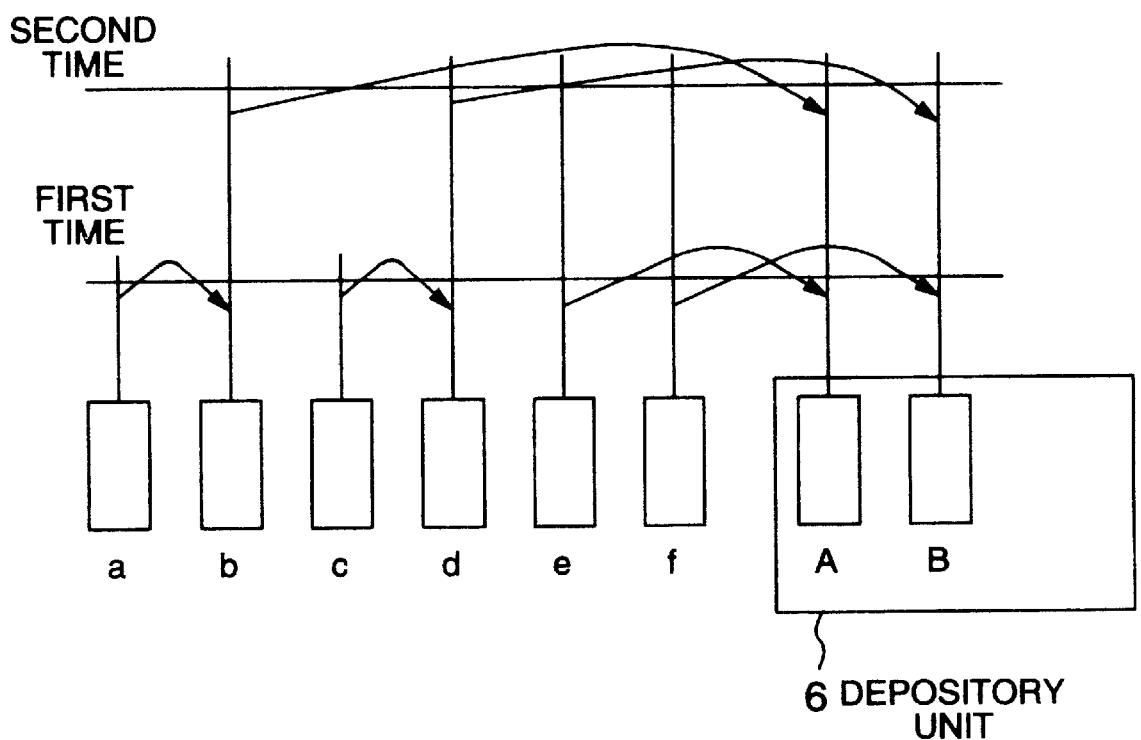
FIG. 4 is a schematic diagram illustrating a control procedure of transferring the values of electronic money stored in the electronic money coffer.

FIG. 4 is an illustrative diagram explaining the electronic money transfer control procedure to be executed by the electronic money coffer 1 shown in FIG. 1. For the convenience of description, it is assumed that the electronic money storing medium is an IC card, that two IC cards (A, B) are housed in the fire-resistant depository unit 6, and that six (a, b, c, d, e and f) IC cards are housed outside of the depository unit 6. It is also assumed that transfers of electronic money to external apparatuses are intercepted at the same time.

At the first transfer, the value of a is transferred to b, the value of c is transferred to d, the value of e is transferred to A, and the value of f is transferred to B. At the second transfer, the value of b is transferred to A, and the value of d is transferred to B. With this transfer control, it is possible to transfer the values of electronic money in all six electronic money storing media outside of the depository unit 6 into the media in the depository unit 6 by performing transfer operations twice. In this manner, the values of electronic money are transferred both between the electronic money cards outside of the depository unit 6 and between the electronic money cards outside of the depository unit 6 and the electronic money cards in the depository unit 6, so that electronic money can be transferred very efficiently.

Next, the depository unit 6 housing therein the electronic money storing media A and B will be described with reference to FIG. 5.

Figure 5:
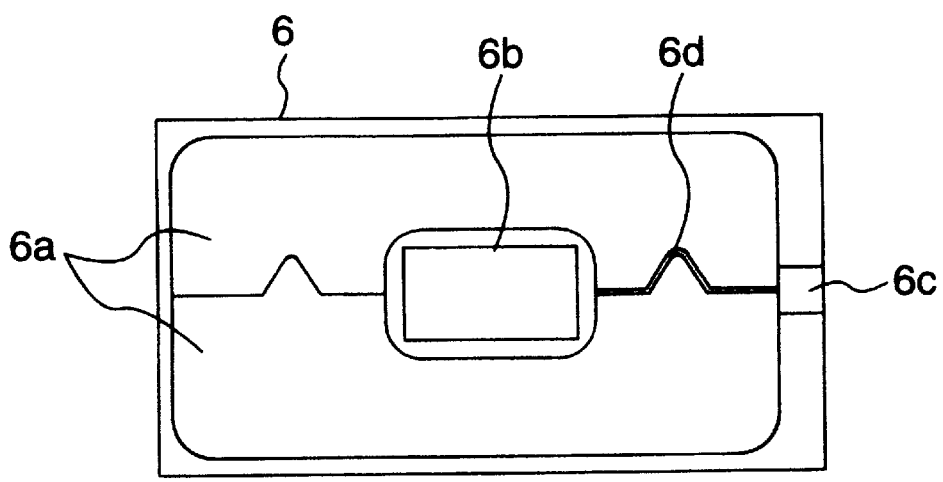
FIG. 5 is a schematic diagram showing an example of the inner structure of a depository unit 6 shown in FIG. 1.

FIG. 5 is a schematic diagram showing an example of the inner structure of the depository unit 6 shown in FIG. 1. Reference numeral 6 represents a depository unit, reference numeral 6a represents heat insulating material such as refractory brick, reference numeral 6b represents an electronic money storing medium such as an IC card, reference numeral 6c represents an interface connector to be connected to the controller 5 shown in FIG. 1, and reference numeral 6d represents an interface cable for interconnecting the electronic money storing medium 6b and the interface connector 6c. Via this interface cable 6d, the value of electronic money in the electronic money storing medium outside of the depository unit 6 is transferred to the depository unit 6.

Since the electronic money storing medium 6b is covered with the heat insulating material such as refractory brick, this medium 6b in the depository unit 6 can be protected even if the electronic money coffer 1 is burnt by a fire or the like.

Specific examples of the electronic money storing medium 6b housed in the depository unit 6 will be described with reference to FIGS. 6 and 7.

Figure 6:
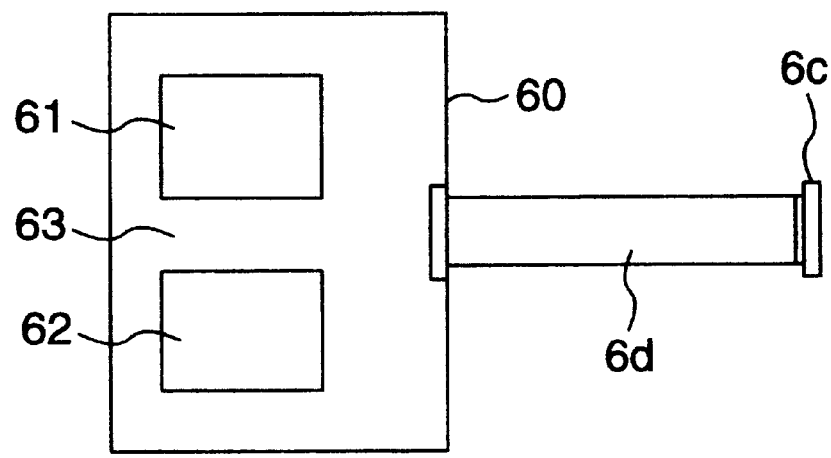
FIG. 6 is a schematic diagram showing another example of the structure of an electronic money storing medium.

FIG. 6 is a schematic diagram showing another example of the structure of the electronic money storing medium shown in FIG. 5. The electronic money storing medium 60 has an IC 61 and an IC 62 formed on a substrate 63. IC 61 is made of an electronic money IC chip generally implemented in an IC card, and IC 62 performs an interface control for the ICRW control unit 5c and the like shown in FIG. 2. ICs 61 and 62 are connected via an interface cable 6d to an interface connector 6c. With this structure, the electronic money storing medium 60 itself and the depository unit 6 shown in FIG. 6 for housing it can be made compact. The interface cable 6d is made of lead wires having a shape and material which do not conduct external heat to the electronic money storing medium 60.

Although one IC 61 and one IC 62 are formed on the substrate 63, a plurality of such ICs may be formed on the substrate. A plurality of electronic money storing medial 60 may be housed in or outside of the depository unit 6.

Figure 7:
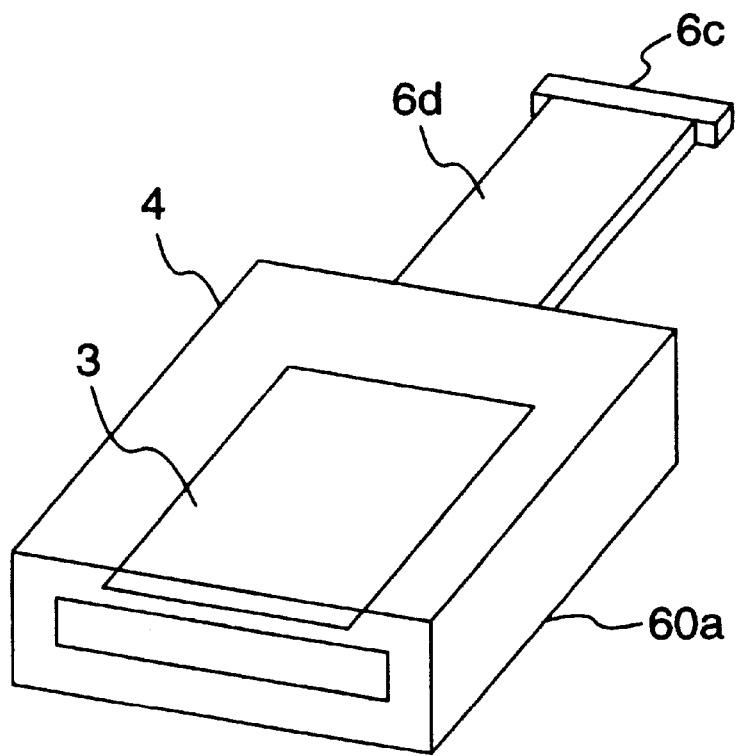
FIG. 7 is a schematic perspective view showing still another example of the structure of an electronic money storing medium.

FIG. 7 is a perspective view showing still another example of the structure of the electronic money storing medium. This electronic money storing medium 60a is constituted of the ICRW unit 4 and the IC card 3 outside of the fire-resistant depository unit 6 shown in FIG. 1, respectively connected to an interface connector 6c and an interface cable 6d similar to those shown in FIG. 6. With this structure, the ICRW unit 4 and IC card can be used commonly in and outside of the fire-resistant depository unit 6. Similar to the example shown in FIG. 6, a plurality of electronic money storing media may be housed in the depository unit 6.

Figure 8:
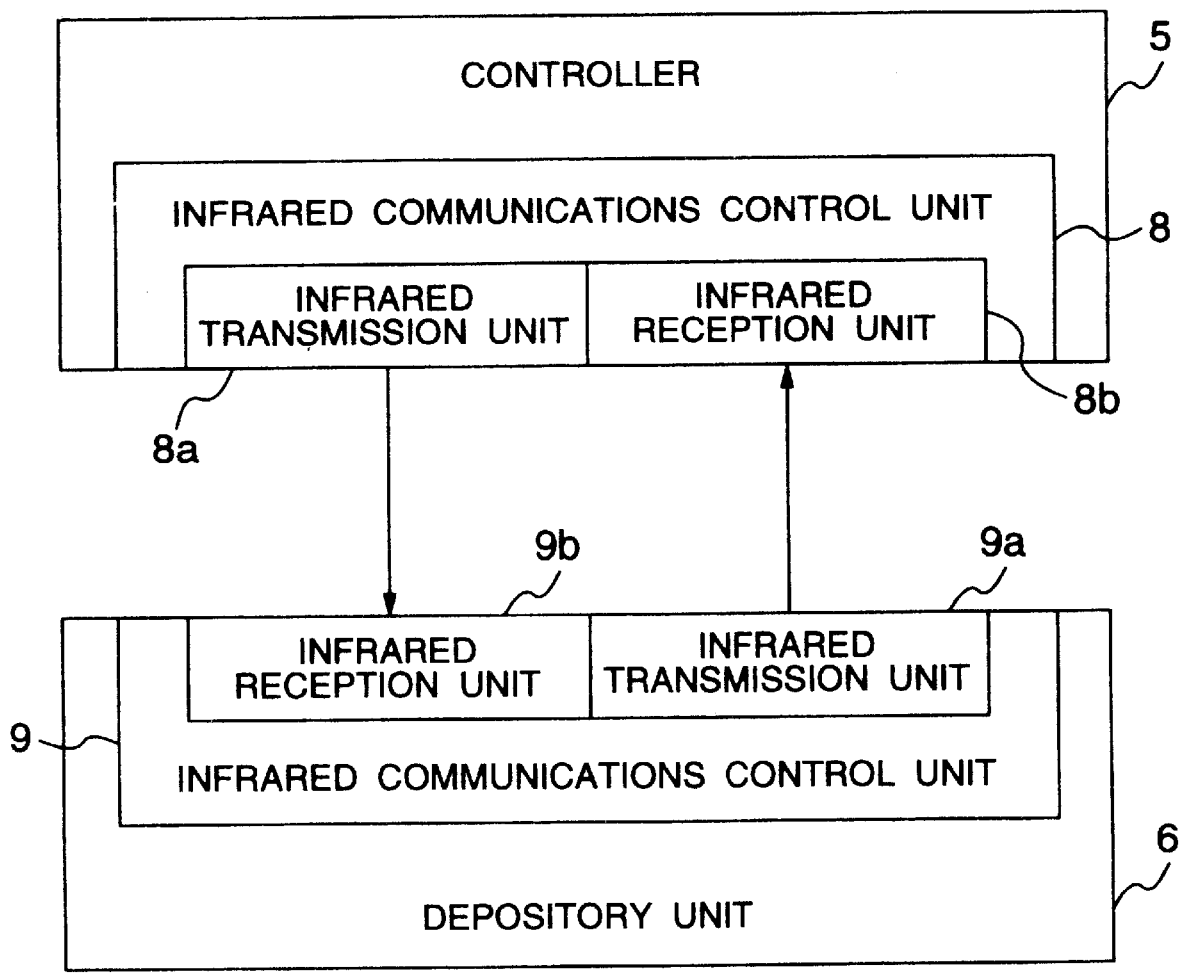
FIG. 8 is a block diagram showing an example of the structure of a mechanism of transferring electronic money in a wireless manner.

FIG. 8 is a block diagram showing an example of the structure of a mechanism of transferring electronic money in the electronic money coffer 1 shown in FIG. 1 in a wireless manner. The controller 5 and depository unit 6 are provided with infrared communications control units 8 and 9, respectively.

In the transfer of electronic money between the infrared communications control units 8 and 9, infrared transmission units 8a and 9a convert transfer control signals and information of values of electronic money in the electronic money storing media into infrared on/off information and transmit this information, whereas infrared reception units 8b and 9b receive infrared on/off information and convert this information into signal information. The infrared communications control unit 8 of the controller 5 may be provided with only the infrared transmission unit 8a without the infrared reception unit 8b. This is because as described previously, the values of electronic money in the controller 5 side are transferred to the safe and robust depository unit 6 when any trouble occurs in the electronic money coffer 1. Electronic money can be transferred safely in a wireless manner.

As described above with reference to FIGS. 1 to 8, the electronic money coffer of this embodiment is divided into a plurality of blocks for housing IC cards or electronic money storing media such as boards mounted with chips same as IC chips in the IC card. Some of a plurality of blocks is housed in a structure (depository unit 6) covered with heat insulating material such as refractory bricks resistant to an abnormal state such as fire. When any one of sensors detects an abnormal state such as fire, the values of electronic money in the electronic money storing media used for ordinary dealing outside of the structure resistant to the abnormal state, are transferred to the electronic money storing media in the structure resistant to the abnormal state.

Therefore, even if a building in which the electronic money coffer is installed suffers from a fire or if the electronic money coffer 1 is destructed with a firearm such as a burner by a criminal, all the values of electronic money are transferred in a short time to the depository unit having the structure resistance to an abnormal state and the electronic money assets can be maintained safely. Furthermore, since the safety of the depository unit itself is preserved relative to an abnormal state such as fire, it is not necessary that the whole of the electronic money coffer and a building or house in which the electronic money coffer is installed have a structure resistant to an abnormal state such as fire. It is therefore possible to improve the safety of an electronic money dealing system inexpensively.

Still further, since the uninterruptible power source unit with a built-in battery is used, even if an ordinary power supply is intercepted by a fire or the like before the sensor detects the abnormal state, a power can be supplied by switching to the uninterruptible power source, ensuring the sensor detection operation and electronic money transfer operation.

Further, in transferring the values of electronic money during ordinary money dealing to the electronic money storing medium in the depository unit 6 having a structure resistant to an abnormal state, a plurality of combinations of transfers between electronic money storing media in and outside of the depository unit are used so that electronic money transfer can be performed in a short time.

If a single or a plurality of electronic money storing media (not IC cards but only substrates or the like on which IC chips of an IC card are formed) are housed in the depository unit 6 having a structure resistant to an abnormal state, the depository unit 6 can be made more compact.

If the depository unit 6 resistant to an abnormal state is configured so as to house an electronic money storing medium constituted of both an IC card used for general electronic money dealing and an ICRW unit, the IC card and ICRW unit can be used commonly in and outside of the unit 6.

If electronic money dealing is performed in a wireless manner, electronic money transfer can be made more safely.

The invention is not limited only to the embodiment described with reference to FIGS. 1 to 8, but various modifications are possible without departing from the scope and spirit of the invention. For example, a pattern of the electronic money transfer procedure shown in FIG. 4 and intended to be completed in a shortest time may be changed to another pattern if only it allows such a shortest time transfer. Sensors for detecting temperature, smoke and the like may be mounted in a building in which the electronic money coffer is installed, instead of mounting them in the electronic money coffer. For example, a signal from a fire alarming device installed in a building may be used as a sensor signal. Transfer of the values of electronic money in a wireless manner may use radio waves in place of infrared rays.

In the above embodiment, the values of electronic money in IC cards in the fire-resistant depository unit are transferred when a sensor detects an abnormal state. The invention may be applied to safe transfer of electronic money to the depository unit in another abnormal state other than fire.

The depository unit is not limited only to fire-resistance and depends on an abnormal state to counter. For example, in a district where flood damages frequently occur, the values of electronic money are transferred to the safe depository unit when a water content sensor detects a flood damage. In this case, the depository unit is structured to be at least wafer-resistant, or obviously both water-resistant and fire-resistant.

According to the present invention, it is possible to improve the safety of an electronic money coffer and the safety of electronic money assets in an electronic money dealing system.

What is claimed is:

1. An electronic money coffer for accommodating electronic money storing media, comprising:
    a first depository unit for accommodating an electronic money storing medium and transferring electronic money data to and from an outside of the electronic money coffer;
    a second depository unit for accommodating an electronic money medium, said second depository unit having a structure resistant to an abnormal state;
    a sensor for detecting at least one abnormality around the electronic money coffer; and
    a controller, responsive to a detection of an occurrence of the abnormal state by said sensor, for transferring a value of electronic money in the electronic money storing medium housed in said first depository unit to the electronic money storing medium housed in said second depository unit.

2. An electronic money coffer for accommodating electronic money storing media, comprising:
    a first depository unit for accommodating an electronic money storing medium and transferring electronic money data to and from an outside of the electronic money coffer;
    a second depository unit for accommodating an electronic money medium, said second depository unit having a structure resistant to an abnormal state;
    a sensor for detecting at least one abnormality around the electronic money coffer; and
    a controller, responsive to a detection of an occurrence of the abnormal state by said sensor, for transferring a value of electronic money in the electronic money storing medium housed in said first depository unit to the electronic money storing medium housed in said second depository unit;
    wherein said controller comprises: a line control unit for controlling communications with the outside of the electronic money coffer; a sensor control unit for controlling said sensor; a read/write control unit for controlling a read/write of electronic money data in the electronic money storing medium; and a main control unit,
    said first and second depository units each include a read/write unit for reading/writing electronic money data from/to the electronic money storing medium;
    a detection of an occurrence of the abnormal state by said sensor is transmitted to the main control unit via the sensor control unit; and
    said main control unit controls the read/write control unit so that the read/write unit of said first depository unit reads a value of electronic money in the electronic money medium housed in said first depository unit, in response to the detection of an occurrence of the abnormal state, and that the read/write unit of said second depository unit writes the read value of electronic money into the electronic money storing medium housed in said second depository unit.

3. An electronic money coffer according to claim 1, wherein the electronic money storing medium is an IC card or a board mounted with an IC chip.

4. An electronic money coffer according to claim 1, further comprising a battery, wherein when a power supply from the outside of the electronic money coffer is stopped, a power is supplied from said battery to maintain the operations of said controller and said sensor.

5. An electronic money coffer for accommodating electronic money storing media, comprising:
    a first depository unit for accommodating an electronic money storing medium and transferring electronic money data to and from an outside of the electronic money coffer;
    a second depository unit for accommodating an electronic money medium, said second depository unit having a structure resistant to an abnormal state;
    a sensor for detecting at least one abnormality around the electronic money coffer; and
    a controller, responsive to a detection of an occurrence of the abnormal state by said sensor, for transferring a value of electronic money in the electronic money storing medium housed in said first depository unit to the electronic money storing medium housed in said second depository unit;
    wherein a plurality of electronic money storing media are housed in said first depository unit, and while values of electronic money in the electronic money storing media housed in said first depository unit are transferred to the electronic money storing medium housed in said second depository unit, values of electronic money are also transferred between the electronic money storing media housed in said first depository unit.

6. An electronic money coffer for accommodating electronic money storing media, comprising:
    a first depository unit for accommodating an electronic money storing medium and transferring electronic money data to and from an outside of the electronic money coffer;
    a second depository unit for accommodating an electronic money medium, said second depository unit having a structure resistant to an abnormal state;
    a sensor for detecting at least one abnormality around the electronic money coffer; and
    a controller, responsive to a detection of an occurrence of the abnormal state by said sensor, for transferring a value of electronic money in the electronic money storing medium housed in said first depository unit to the electronic money storing medium housed in said second depository unit;
    further comprising heat insulating material for reducing heat conduction to said second depository unit.

7. An electronic money coffer for accommodating electronic money storing media, comprising:
    a first depository unit for accommodating an electronic money storing medium and transferring electronic money data to and from an outside of the electronic money coffer;
    a second depository unit for accommodating an electronic money medium, said second depository unit having a structure resistant to an abnormal state;
    a sensor for detecting at least one abnormality around the electronic money coffer; and a controller, responsive to a detection of an occurrence of the abnormal state by said sensor, for transferring a value of electronic money in the electronic money storing medium housed in said first depository unit to the electronic money storing medium housed in said second depository unit;

wherein said controller operates to transfer a value of electronic money in the electronic money storing medium housed in said first depository unit to the electronic money storing medium housed in said second depository unit, in a wireless manner.

8. An electronic money storing apparatus for dealing with electronic money, comprising:

a main control unit;

a sensor for detecting at least one abnormality around the apparatus;

a first depository unit for accommodating an electronic money storing medium, a second depository unit for accommodating an electronic money medium, said second depository unit having a structure resistant to an abnormal state of the apparatus; and a read/write control unit for controlling a read/write of electronic money data to and from the electronic money storing medium, wherein said main control unit controls said read/write control unit to read a value of electronic money in the electronic money storing medium housed in said first depository unit and to write the read value of electronic money in the electronic money storing medium housed in said second depository unit, in response to a detection of the abnormal state by said sensor.

9. An electronic money storing apparatus according to claim 8, wherein each of the electronic money storing media housed in said first and second depository units is an IC card or an IC chip mounted on a substrate.

10. An electronic money storing apparatus according to claim 8, further comprising a power source unit for supplying by itself a power to the apparatus, and when said main control unit detects a stop of a power supply from an outside of the apparatus, a power supply is switched to said power source unit.

11. An electronic money storing apparatus for dealing with electronic money, comprising:

a main control unit;

a sensor for detecting at least one abnormality around the apparatus;

a first depository unit for accommodating an electronic money storing medium, a second depository unit for accommodating an electronic money medium, said second depository unit having structure resistant to an abnormal state of the apparatus; and a read/write control unit for controlling a read/write of electronic money data to and from the electronic money storing medium, wherein said main control unit controls said read/write control unit to read a value of electronic money in the electronic money storing medium housed in said first depository unit and to write the read value of electronic money in the electronic money storing medium housed in said second depository unit, in response to a detection of the abnormal state by said sensor;

wherein a plurality of electronic money storing media are housed in said first depository unit, and when values of electronic money in the electronic money storing media housed in said first depository unit are written in the electronic money storing medium housed in said second depository unit, said main control unit controls said read/write control unit to perform a read/write control of electronic money also between the plurality of electronic money storing media housed in said first depository unit.

12. An electronic money transfer method for an electronic money storing apparatus provided with a sensor for detecting at least one abnormality of the apparatus, a first depository unit for accommodating a plurality of electronic money storing media, and a second depository unit for accommodating an electronic money storing medium, the second depository unit being resistant to an abnormal state of the apparatus, the method comprising:

a first step of making the sensor detect an abnormal state;

a second step of transferring values of electronic money in the plurality of electronic money storing media housed in the first depository unit to the electronic money storing medium housed in said second depository unit;

a third step of transferring values of electronic money to and from the electronic money storing medium housed in the first depository unit, excepting the electronic money storing media which transfer values of electronic money to the electronic money storing medium housed in the first depository unit among the plurality of electronic money storing media housed in the first depository unit; and a fourth step of performing transfers of the values of electronic money both at said second and third steps.

* * * * *